O. MOLANDER.
DYNAMITE HEATER.
APPLICATION FILED JUNE 25, 1909.

960,370.

Patented June 7, 1910.

Witnesses
E. Larson
S. E. Dodge

Inventor
O. Molander
By Beeler & Robb
Attorneys

ED STATES PATENT OFFICE.

OSCAR MOLANDER, OF GILBERT, MINNESOTA.

DYNAMITE-HEATER.

960,370.

Specification of Letters Patent. Patented June 7, 1910.

Application filed June 25, 1909. Serial No. 504,296.

*To all whom it may concern:*

Be it known that I, OSCAR MOLANDER, citizen of the United States, residing at Gilbert, in the county of St. Louis and State of Minnesota, have invented certain new and useful Improvements in Dynamite-Heaters, of which the following is a specification.

The object of this invention is to provide an improved form of heater for stick dynamite.

A number of heaters especially designed for the above purpose have been invented but the same, in so far as I am aware, have all been constructed so that at least two or three hours are required in which to heat the dynamite properly preparatory to its use.

It has been my aim in the embodiment of my invention to devise a heater which will facilitate the operation of heating the explosive, only about forty minutes being required to accomplish the desired operation in the use of my invention.

For a full understanding of the invention, reference is to be had to the following detail description and to the accompanying drawings, in which—

Figure 1:
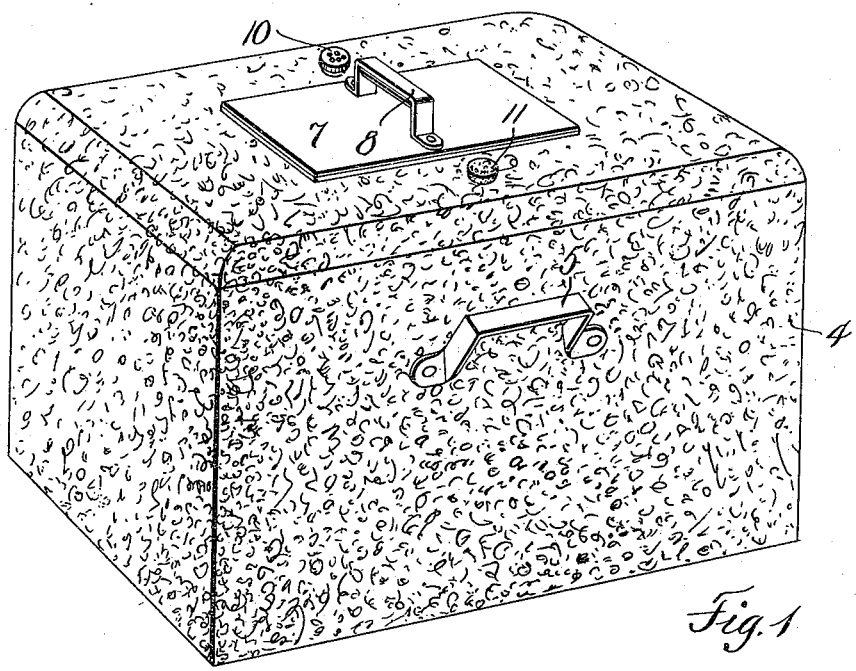
Figure 2:
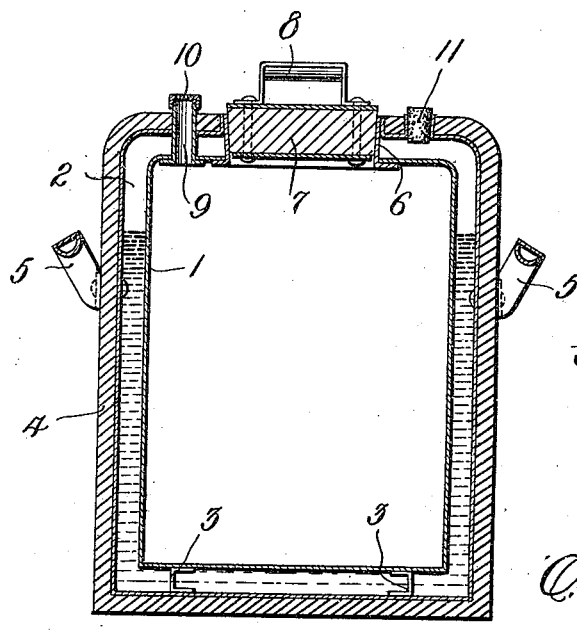

Figure 1 is a perspective view of a heater embodying the essential features of the invention, and Fig. 2 is a vertical sectional view taken about centrally through the heater.

Throughout the following detail description and on the several figures of the drawings similar parts are referred to by like reference characters.

Describing my invention in detail, I provide an inner dynamite holder or receptacle 1 which is inclosed by a water receptacle 2 and spaced therefrom at the adjacent sides. The bottom of the receptacle 1 is supported in spaced relation to the bottom of the receptacle 2 by means of legs 3 and both of the receptacles 1 and 2 are made preferably of zinc. On the outer side thereof the receptacle 2 is provided with a covering of cork shown at 4 and handles 5 are preferably secured to opposite sides of the receptacle 2 for convenience in handling the heater.

At its top portion the dynamite receptacle 1 is provided with an opening for insertion of the dynamite, and a flange 6 at the edge of said opening extends from the receptacle 1 upwardly through an opening in the receptacle 2. The flange 6 is adapted to receive in the space surrounded thereby a closure or cover 7 having a handle 8 for manipulation thereof, said cover being readily removable to insert or remove the explosive to be heated in the receptacle 1.

To permit the escape of any foul gases that may generate in the receptacle 1 a vent tube 9 is provided, the same extending from the upper end of the receptacle 1 through the space between said receptacle and the top of the receptacle 2, and through the top portion of said receptacle 2. A screw cap 10 on the upper end of the tube 9 is apertured to permit gases to escape through the tube to the outer atmosphere.

Water may be placed in the space between the receptacles 1 and 2 through an opening in the top of the receptacle 2 and which is ordinarily closed by a stopper 11.

A heater constructed in accordance with my invention can be transported from place to place very readily and with safety in so far as an explosion is concerned. After hot water has been placed in the space between the receptacles 1 and 2 it will take about twenty minutes for the inner dynamite receptacle to be heated to the desired degree after which the dynamite may be placed therein and in twenty minutes longer said dynamite will be sufficiently soft for use.

Having thus described the invention, what is claimed as new is:

1. In a heater for explosives, the combination with an outer receptacle, of an outer covering for the receptacle entirely inclosing the same, an inner explosive retaining chamber spaced from said outer receptacle, said inner and outer receptacles having coinciding openings in the tops thereof, a removable closure for said openings, means whereby hot water may be inserted between said receptacles, and means whereby gaseous collections may be permitted to escape from said explosive retaining chamber.

2. In a heater of the class described, the combination with an outer receptacle, of a cork covering entirely inclosing the same for reducing shocks, an inner explosive retaining chamber spaced therefrom, said inner and outer chambers having coinciding openings in the tops thereof, tubular connections between said inner and outer receptacles flanged at their bases to prevent water from being admitted into the inner chamber, a vented closure for one of said openings and a removable closure for the other, and means whereby heated water may be placed in the space between the outer and inner chambers, as and for the purpose set forth.

In testimony whereof I affix my signature in presence of two witnesses.

OSCAR MOLANDER.

Witnesses:
ALBERT BERGSTROM,
EDW. CARLSON.